United States Patent
Lee et al.

(10) Patent No.: US 10,247,549 B2
(45) Date of Patent: Apr. 2, 2019

(54) SHAFT ACCURACY MEASURING DEVICE FOR MEASURING ACCURACY OF OUTPUT SHAFT OF MOTOR

(71) Applicant: FANUC CORPORATION, Yamanashi (JP)

(72) Inventors: SeungJun Lee, Yamanashi (JP); Hidetoshi Uematsu, Yamanashi (JP); Tomohiro Seki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/081,192

(22) Filed: Mar. 25, 2016

(65) Prior Publication Data

US 2016/0341548 A1 Nov. 24, 2016

(30) Foreign Application Priority Data

May 19, 2015 (JP) .................. 2015-102050

(51) Int. Cl.
*G01B 11/27* (2006.01)
(52) U.S. Cl.
CPC .................. *G01B 11/272* (2013.01)
(58) Field of Classification Search
CPC .................................................. G01B 11/272
USPC ........................................................ 356/625
See application file for complete search history.

(56) References Cited

U.S. PATENT DOCUMENTS

| | | | |
|---|---|---|---|
| 5,365,458 A | 11/1994 | Tamura et al. | |
| 5,736,735 A * | 4/1998 | Hagiwara | G02B 26/10 250/225 |
| 5,863,136 A * | 1/1999 | Miyazaki | F16C 19/54 384/448 |
| 6,332,942 B1 * | 12/2001 | Hector | B29C 65/7811 156/273.7 |
| 2002/0117348 A1 * | 8/2002 | Shimizu | B62D 5/0406 180/443 |
| 2003/0117590 A1 * | 6/2003 | Hunziker | G02B 7/003 353/30 |

(Continued)

FOREIGN PATENT DOCUMENTS

| | | |
|---|---|---|
| JP | 4269601 A | 9/1992 |
| JP | 5227710 A | 9/1993 |
| JP | 7260425 A | 10/1995 |

OTHER PUBLICATIONS

English Abstract for Japanese Publication No. 04-269601 A, published 2993-09-36, 1 pg.

(Continued)

*Primary Examiner* — Tarifur R Chowdhury
*Assistant Examiner* — Omar Nixon
(74) *Attorney, Agent, or Firm* — Fredrikson & Byron, P.A.

(57) ABSTRACT

A shaft accuracy measuring device includes: a measurement unit including a light projecting unit that projects a measuring light and a light receiving unit that receives the measurement light projected by the light projecting unit; a motor installation unit that installs the motor such that the output shaft of the motor is disposed between the light projecting unit and the light receiving unit; and a calculation unit that calculates at least one of axial run-out, center run-out, and face run-out of the motor based on a measurement result of the measurement unit.

9 Claims, 19 Drawing Sheets

(56) References Cited

U.S. PATENT DOCUMENTS

| | | | |
|---|---|---|---|
| 2004/0143413 A1* | 7/2004 | Oystol | G01C 17/38 |
| | | | 702/150 |
| 2004/0226336 A1* | 11/2004 | George | B21D 3/16 |
| | | | 72/362 |
| 2007/0036624 A1 | 2/2007 | Bayha et al. | |
| 2007/0253002 A1* | 11/2007 | Hermann | G01B 11/272 |
| | | | 356/614 |
| 2012/0134573 A1* | 5/2012 | Higashio | G01B 5/0004 |
| | | | 382/152 |
| 2013/0111690 A1* | 5/2013 | Murata | B60S 1/0425 |
| | | | 15/250.31 |
| 2013/0114071 A1* | 5/2013 | Weihrauch | G01B 11/272 |
| | | | 356/138 |
| 2014/0193535 A1* | 7/2014 | Bang | B29C 45/14 |
| | | | 425/129.1 |

OTHER PUBLICATIONS

English Abstract and Machine Translation for Japanese Publication No. 05-227710 A, published Sep. 3, 1993, 7 pgs.
English Abstract and Machine Translation for Japanese Publication No. 07-260425 A, published Oct. 13, 1995, 11 pgs.

\* cited by examiner

SHAFT ACCURACY MEASURING DEVICE FOR MEASURING ACCURACY OF OUTPUT SHAFT OF MOTOR

BACKGROUND OF THE INVENTION

1. Field of the Invention

The present invention relates to a shaft accuracy measuring device for measuring accuracy of an output shaft of a motor.

2. Description of the Related Art

The output shaft of a motor is inserted through a front bearing and a rear bearing in a stator. There is a case in which the shaft accuracy of the output shaft is decreased depending on the assembly accuracy and the machining accuracy of the stator. More specifically, there is a case in which deflection (axial run-out), center deviation (center run-out), and inclination (face run-out) of the output shaft of the motor may occur. When the motor, whose shaft accuracy is thus decreased, is mounted onto a machine tool or the like, there is a tendency that vibration or abnormal noise is produced when the machine tool is driven, and the accuracy of machining by the machine tool is decreased as well.

As such, it is necessary to check the shaft accuracy of the motor after the motor has been assembled. More specifically, with a dial gauge attached to the motor or the motor shaft, the shaft accuracy is checked through the value of the dial gauge, while rotating the motor shaft.

However, when using a dial gauge, it is necessary for the operator to mount the dial gauge onto the motor or the like, adjust the gauge head of the dial gauge, and read and record the value of the dial gauge. Such an operation is cumbersome and time-consuming. As such, at a production site where many motors are manufactured, all of the many motors cannot be inspected, and thus sampling inspection is performed. Further, there is also a problem in which the measurement result differs depending on the operator's skill level.

Accordingly, Japanese Laid-open Patent Publication No. Hei 04-269601 and Japanese Laid-open Patent Publication No. Hei 05-227710 disclose a technique for measuring center run-out of the shaft of a motor in a non-contact manner using an electrostatic capacitance sensor. Further, Japanese Laid-open Patent Publication No. Hei 07-260425 discloses a technique for measuring run-out of a rotating body in a non-contact manner using a plurality of light projecting units and a plurality of light receiving units.

SUMMARY OF THE INVENTION

However, there is a problem in that the cost of the measurement device is increased when the electrostatic capacitor sensor is used or when the plurality of light projecting units and the plurality of light receiving units are used.

Further, preferably, the shaft accuracy of a motor is comprehensively judged through axial run-out, center run-out, and face run-out of the motor.

The present invention has been made in view of such circumstances, and has for an object to provide a shaft accuracy measuring device that is capable of easily measuring, in a non-contact manner, axial run-out, center run-out, and face run-out of a motor, while suppressing cost.

In order to achieve the above-described object, according to a first aspect of the present invention, there is provided a shaft accuracy measuring device that includes: a measurement unit including a light projecting unit that projects a measurement light and a light receiving unit that received the measurement light projected by the light projecting unit; a motor installation unit that installs a motor such that an output shaft of the motor is disposed between the light projecting unit and the light receiving unit; and a calculation unit that calculates at least one of axial run-out, center run-out, and face run-out of the motor based on a measurement result of the measurement unit.

According to a second aspect of the present invention, the shaft accuracy measuring device according to the first aspect further includes a driving unit that rotates the output shaft of the motor installed on the motor installation unit, wherein the calculation unit calculates the axial run-out of the output shaft based on the measurement result of the measurement unit when the driving unit rotates the output shaft of the motor.

According to a third aspect of the present invention, the shaft accuracy measuring device according to the first aspect further includes a driving unit that rotates the motor installation unit relative to the measurement unit and rotates the output shaft of the motor, wherein while the driving unit rotates the motor installation unit relative to the measurement unit and rotates the output shaft of the motor, the calculation unit measures center run-out of the output shaft based on the measurement result of the measurement unit.

According to a fourth aspect of the present invention, the shaft accuracy measuring device according to the first aspect further includes a driving unit that rotates the motor installation unit relative to the measurement unit and rotates the output shaft of the motor, wherein while the driving unit rotates the motor installation unit relative to the measurement unit and rotates the output shaft of the motor, the calculation unit measures face run-out of the output shaft based on the measurement result of the measurement unit.

According to a fifth aspect of the present invention, the shaft accuracy measuring device according to the third or fourth aspect further includes a measuring jig including a reference axis portion located in vicinity of the output shaft of the motor at an end face of the motor and having a predetermined angle with respect to the end face.

According to a sixth aspect of the present invention, in the shaft accuracy measuring device according to the first aspect, the measurement unit includes a plurality of the light projecting unit and the light receiving unit.

According to a seventh aspect of the present invention, the shaft accuracy measuring device according to any one of the first to sixth aspects further includes a moving unit that unitarily and translationally moves the light projecting unit and the associated light receiving unit.

These and other objects, features, and advantages of the present invention will become more clear from a detailed description of exemplary embodiments of the present invention illustrated in the accompanying drawings.

DETAILED DESCRIPTION

Figure 1:
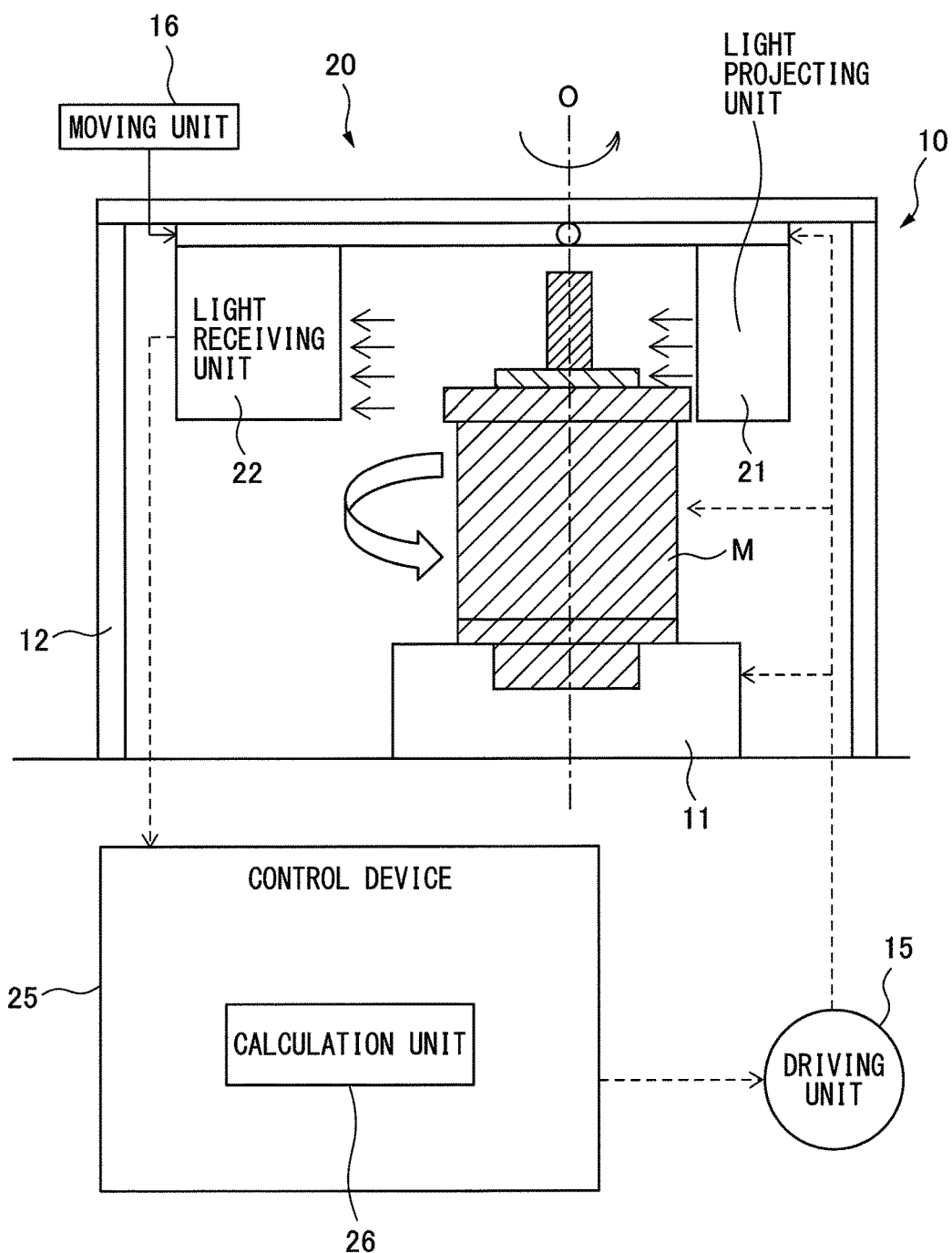
FIG. 1 is a schematic view of a shaft accuracy measuring device based on the present invention.

Referring to the accompanying drawings, embodiments of the present invention will be described hereinbelow. In the drawings, like components are denoted by like reference numerals. In order to facilitate understanding, the scale of the drawings has been changed arbitrarily.

FIG. 1 is a schematic view of a shaft accuracy measuring device based on the present invention. As illustrated in FIG. 1, the shaft accuracy measuring device 10 includes a motor installation unit 11 on which is installed a motor M whose shaft accuracy is to be measured. As illustrated, the motor installation unit 11 installs the motor M in a manner such that the output shaft of the motor M is directed upwardly in a vertical direction. However, the motor installation unit 11 may install the motor M in a manner such that the output shaft thereof is directed in a known, different direction. The motor installation unit 11 can be rotated about the output shaft of the motor M by a driving unit 15 such as another motor. In other words, an axis of rotation O of the motor installation unit 11 is coincident with an axis of the output shaft of the motor M.

Further, a measurement unit 20, which includes a light projecting unit 21 that projects a measurement light and a light receiving unit 22 that receives the measurement light projected by the light projecting unit 21, is located above the motor installation unit 11. As illustrated, the output shaft of the motor M installed by the motor installation unit 11 is located between the light projecting unit 21 and the light receiving unit 22. Further, the measurement unit 20 is rotatably mounted by a driving unit 15 to a frame 12 provided in a manner surrounding the motor installation unit 11. As can be seen from FIG. 1, an axis of rotation of the measurement unit 20 may be an axis same as that of the output shaft of the motor M. Further, the measuring unit 20 is capable of rotating the output shaft 31 itself of the motor M.

Further, a control device 25 includes a calculation unit 26 that calculates at least one of the axial run-out, center run-out, and face run-out of the motor M based on a measurement result of the measurement unit 20. The measurement result of the measurement unit 20 is sequentially stored in a storage unit (not illustrated) of the control device 25 for each predetermined control cycle.

Figure 2:
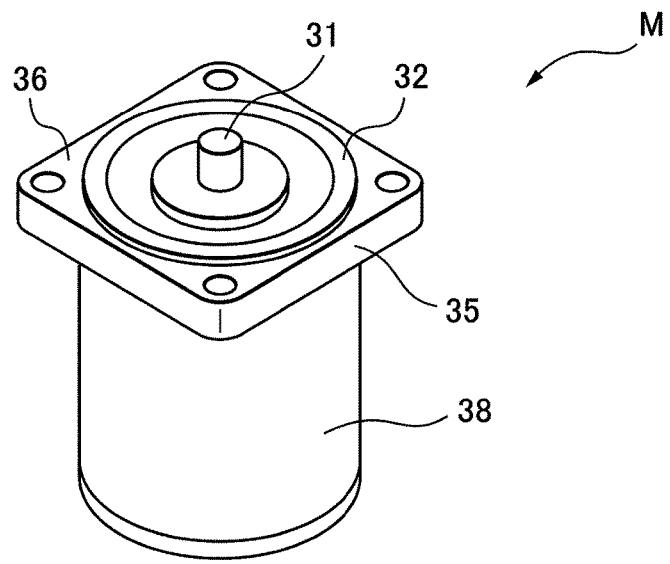
FIG. 2 is a perspective view of a motor to be measured by the shaft accuracy measuring device of the present invention.

FIG. 2 is a perspective view of the motor to be measured by the shaft accuracy measuring device of the present invention. As illustrated in FIG. 2, the motor M such as a servo motor includes a substantially cylindrical motor body 38, and a substantially rectangular flange 35 provided thereabove. Further, a cylindrical output shaft 31 of the motor M extends upwardly from a flange surface 36 of the flange 35. Around the output shaft 31, there is a formed spigot portion 32. In addition, apertures formed in four corners of the flange 35.

Another component such, for example, as a decelerator, to which the motor M is to be coupled, is formed with other apertures and spigot portion corresponding to the apertures and the spigot portion 32 of the motor M. When the motor M is coupled to the other component, the spigot portion 32 of the motor M is engaged with the spigot portion of the other component. Further, screws are threadedly engaged with the apertures of the motor M and the apertures of the other component, thereby causing the motor M and the other component to be coupled to each other.

Figure 3A:
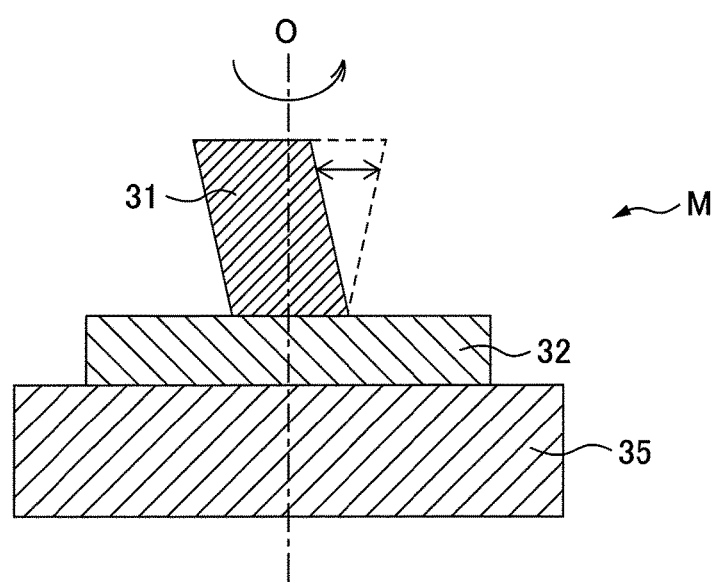
FIG. 3A is a view for explaining axial run-out of the output shaft of the motor.
Figure 3B:
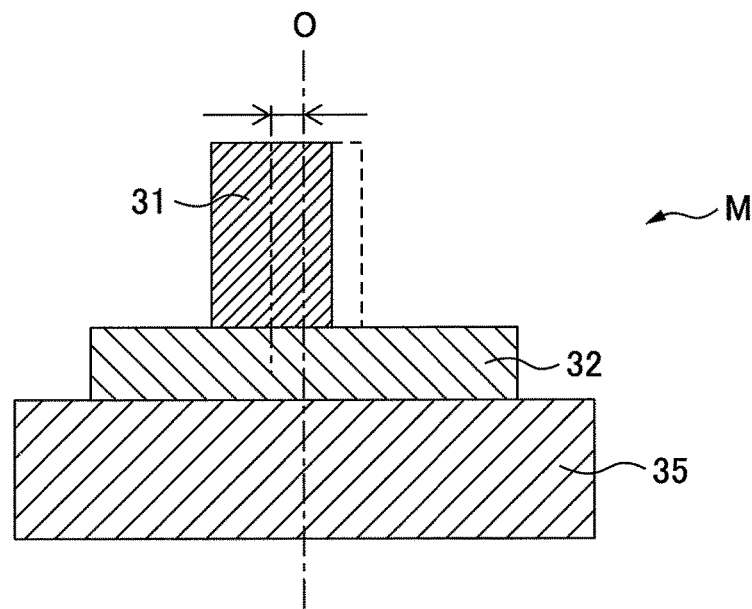
FIG. 3B is a view for explaining center run-out of the output shaft of the motor.
Figure 3C:
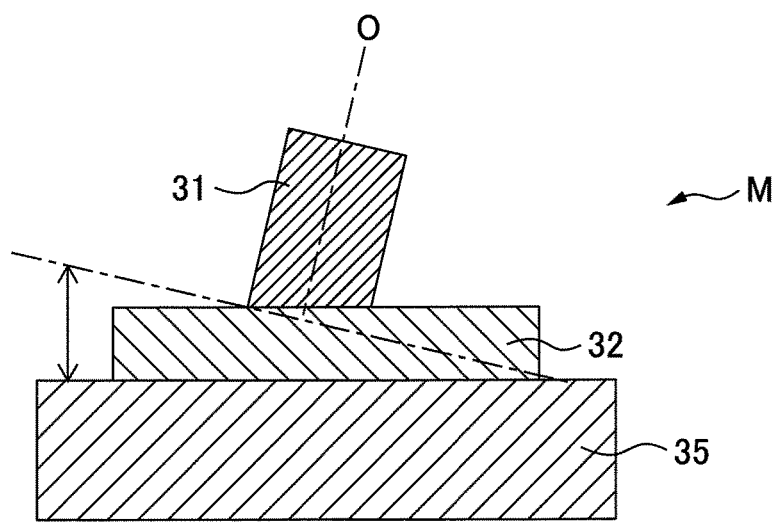
FIG. 3C is a view for explaining face run-out of the output shaft of the motor.

FIGS. 3A through 3C are views for explaining axial run-out, center run-out, and face run-out of the output shaft of the motor, respectively. FIG. 3A illustrates "axial run-out" in which when the output shaft 31 of the motor M is rotated, particularly a distal end of the output shaft 31 is caused to run out due to rotation. Further, FIG. 3B illustrates "center run-out" in which the center of the output shaft 31 of the motor M is deviated from the center of the spigot portion 32. Further, FIG. 3C illustrates "face run-out" in which the output shaft 31 of the motor M is inclined with respect to the upper surface (flange surface) of the flange 35 and the upper surface of the spigot portion 32.

The shaft accuracy measuring device 10 based on the present invention is capable of measuring such axial run-out, center run-out, and face run-out. In order to measure the axial run-out among these, it is necessary to keep the output shaft 31 of the motor M rotating. It is possible to measure the center run-out and the face run-out without keeping the output shaft 31 of the motor M rotating.

Figure 4:
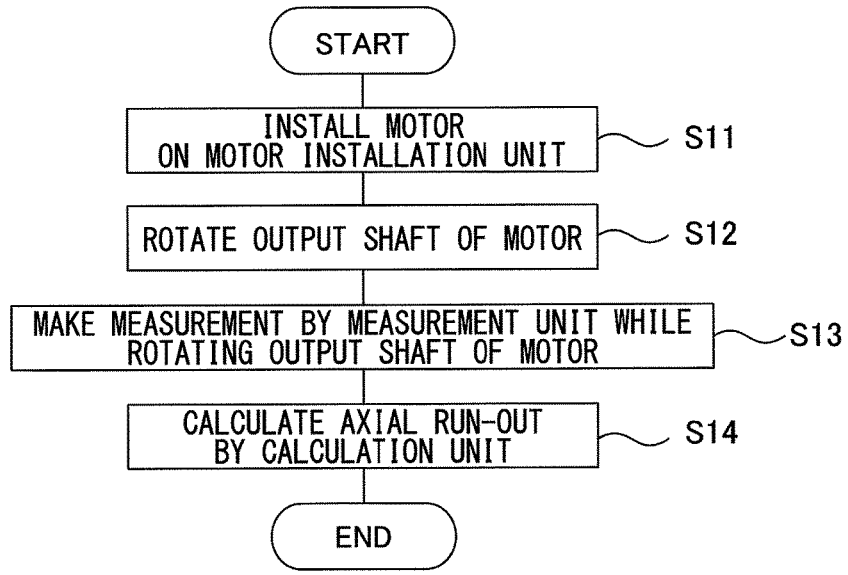
FIG. 4 is a flow chart illustrating an operation when the axial precision measuring device based on the present invention measures axial run-out.

It will first be described that the shaft accuracy measuring device 10 measures axial run-out. FIG. 4 is a flow chart illustrating an operation when the shaft accuracy measuring device 10 based on the present invention measures axial run-out. Referring to FIG. 4, description will be made of the measurement of axial run-out hereinbelow. First, at step S11 of FIG. 4, the motor M is installed on the motor installation unit 11 such that the output shaft 31 is directed upwardly. Subsequently, at step S12, the output shaft 31 of the motor M is rotated about the axis of rotation O by the driving unit 15. Then, the measurement unit 20 is started in a state in which the output shaft 31 is being rotated.

Figure 5:
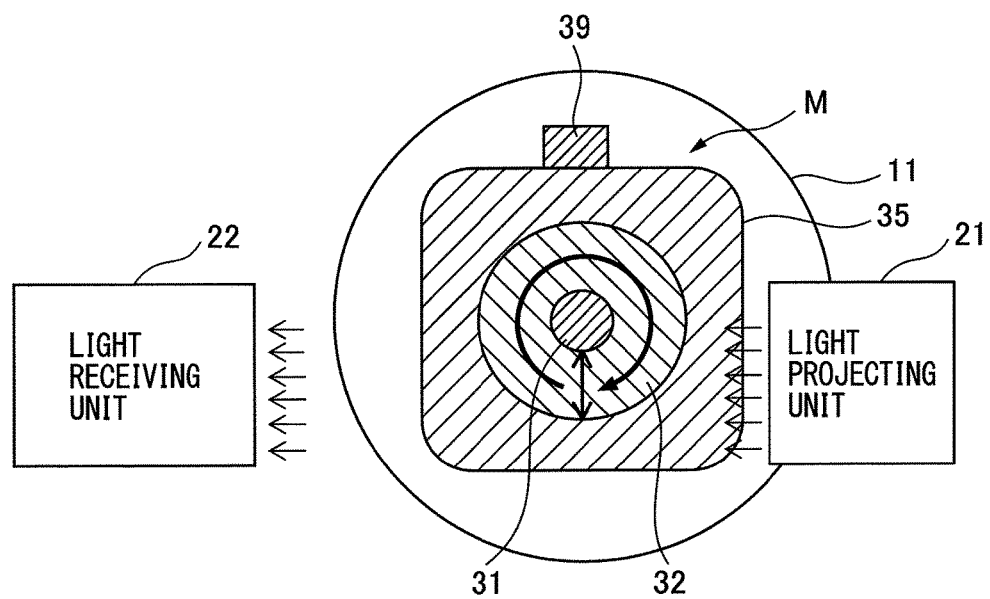
FIG. 5 is a top view of a measurement unit and a motor installation unit when axial run-out is measured.

FIG. 5 is a top view of the measurement unit and the motor installation unit when axial run-out is measured. As illustrated in FIG. 5, the light projecting unit 21 of the measurement unit 20 projects a measurement light, and the light receiving unit 22 receives the measurement light. Then, the calculation unit 26 calculates the axial run-out based on a measurement result of the measurement unit 20 (steps S13 and S14).

Figure 6:
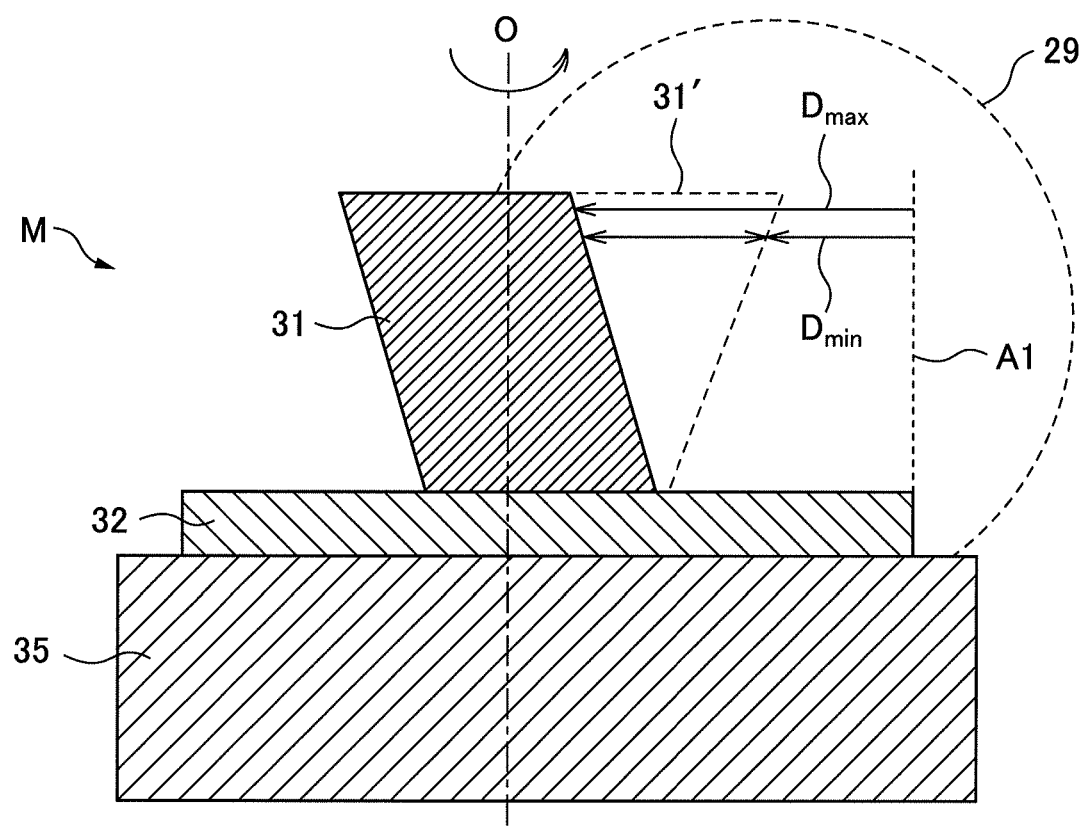
FIG. 6 is a first side view of the motor when axial run-out is measured.

Description will now be made of the procedure for calculating the axial run-out by the calculation unit 26. FIG. 6 is a first side view of the motor when the axial run-out is measured. In FIG. 6, an edge of the spigot portion 32 is included in a circular plane of projection 29 of the measurement unit 20. The output shaft 31 represented by a solid line in FIG. 6 partially departs from the plane of projection 29. However, depending on a rotational angle of the output shaft 31, there may be a case in which the entire output shaft 31 is included in the plane of projection 29 (refer to an output shaft 31' represented by a dotted line).

When the entire output shaft 31 is at least temporarily included in the plane of projection 29, the axial run-out is calculated as follows: As illustrated in FIG. 6, a reference axis A1 parallel to the axis of rotation O is extended from the edge of the spigot portion 32. Then, a maximum distance Dmax and a minimum distance Dmin between the reference axis A1 and the output shaft 31 are determined at the distal end of the output shaft 31. In this manner, the calculation unit 26 calculates, as axial run-out, a difference (=Dmax−Dmin) resulting from subtraction of the minimum distance Dmin from the maximum distance Dmax.

However, since there is a limit for the plane of projection 29 of the measurement unit 20, the entire output shaft 31 is not included in the plane of projection 29 when the size of the motor M is large. In such an instance, the axial run-out is calculated as below by referring to FIG. 7, which is a second side view of the motor when axial run-out is measured.

Figure 7:
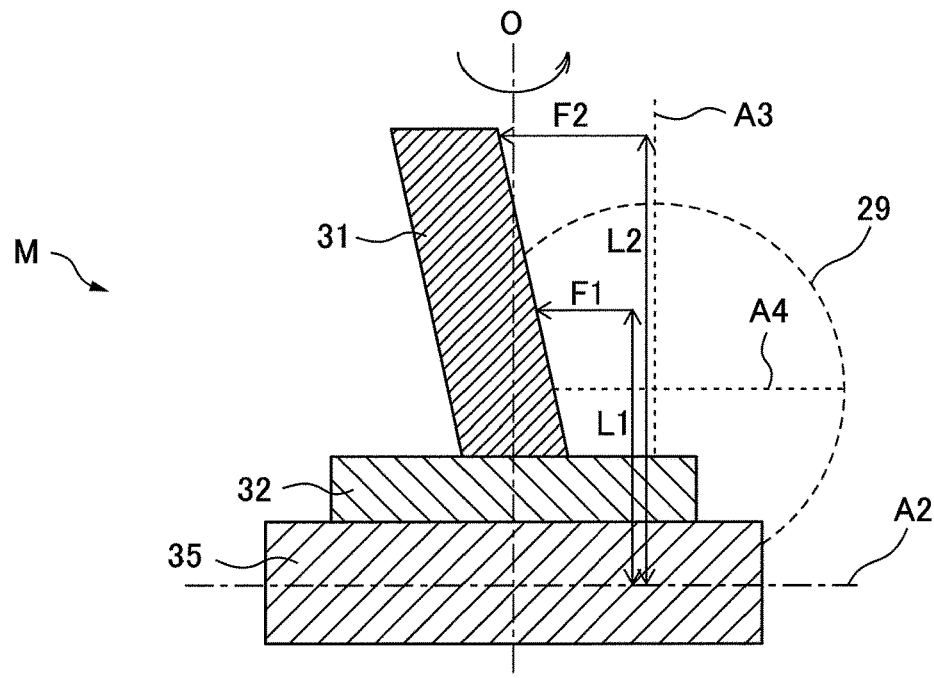
FIG. 7 is a second side view of the motor when axial run-out is measured.

FIG. 7 illustrates a state in which the output shaft 31 is located at a position most distant from a center of the plane of projection 29. Such a state is determined from the measurement result of the measurement unit 20 at step S13. Further, in FIG. 7, two datum lines forming a "cross" shape are represented in the circular plane of projection 29. These two datum lines correspond to the diameter of the plane of projection 29. The datum line parallel to the axis of rotation O is referred to as a datum line A3, and the datum line perpendicular to the axis of rotation O is referred to as a datum line A4.

Let it be assumed here that the size of the spigot portion 32 and the flange 35 of the motor M and that of the associated component are known. The reference axis A2 extends perpendicularly with respect to the axis of rotation O at a center position of a bearing located at a position corresponding to the interior of the flange 35 in FIG. 7. Subsequently, a distance L1 from a virtual intersection between the reference axis A2 and the datum line A3 of the plane of projection 29 to an appropriate position in the plane of projection 29 along the datum line A3, e.g., a position in the vicinity of the intersection between the datum lines A3 and A4 is obtained. When obtaining the distance L1, the size of the motor M is utilized arbitrarily.

Based on the measurement result of the measurement unit 20, a distance F1 between the datum line A3 and the output shaft 31 is obtained at the end of the distance L1. Then, the calculation unit 26 calculates axial run-out F2 at the distal end of the output shaft 31 based on the following equation (1). The equation (1) assumes that the output shaft 31 illustrated in FIG. 7 is straightly inclined.

$$F2=F1\cdot(L2/L1) \tag{1}$$

In this manner, the shaft accuracy measuring device 10 of the present invention can easily calculate axial run-out of the output shaft 31 of the motor M.

Figure 8:
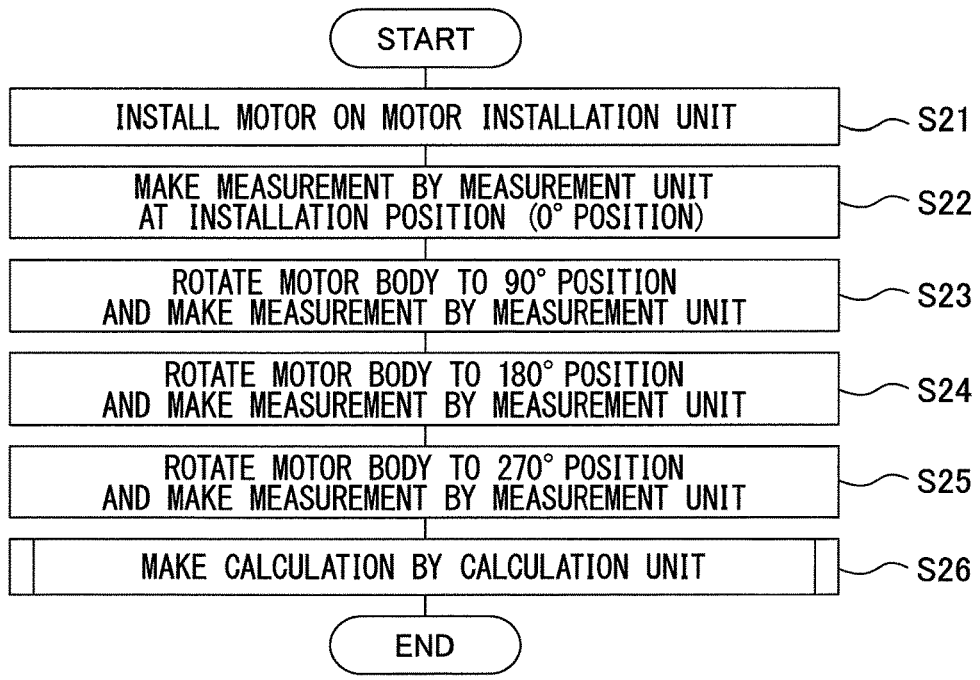
FIG. 8 is a flow chart illustrating the operation when center run-out is measured by the shaft accuracy measuring device based on the present invention.
Figure 9A:
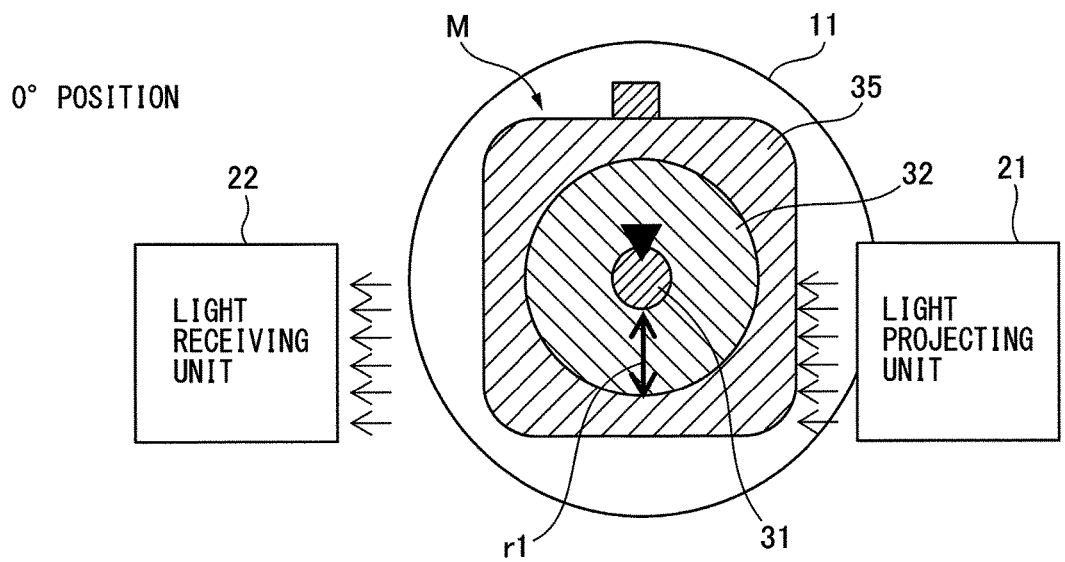
FIG. 9A is a first top view of the measurement unit and the motor installation unit.

It will next be described that the shaft accuracy measuring device 10 measures center run-out. FIG. 8 is a flow chart illustrating an operation when the shaft accuracy measuring device based on the present invention measures center run-out. Further, FIGS. 9A through 9D are first to fourth top views of the measurement unit and the motor installation unit. FIG. 10 is a side view of the motor when measuring axial run-out.

Referring to these figures, description will now be made of measurement of center run-out. First, at step S21 of FIG. 8, the motor M is installed on the motor installation unit 11 as described above, such that the output shaft 31 is directed upwardly. In this instance, it is preferred that the distal end of the output shaft of the motor M be at least partially included in the plane of projection 29 of the measurement unit 20.

Subsequently, at step S22, the installation position where the motor M is installed on the motor installation unit 11 is set to be a 0° position. As illustrated in FIG. 10, the reference axis A1 parallel to the axis of rotation O from the edge of the spigot portion 32 is set. As illustrated in FIG. 9A and FIG. 10, a distance r1 between the output shaft 31 of the motor M and the reference axis A1 is measured by the measurement unit 20. The measurement result is stored in a storage unit (not illustrated) of the control device 25.

Figure 9B:
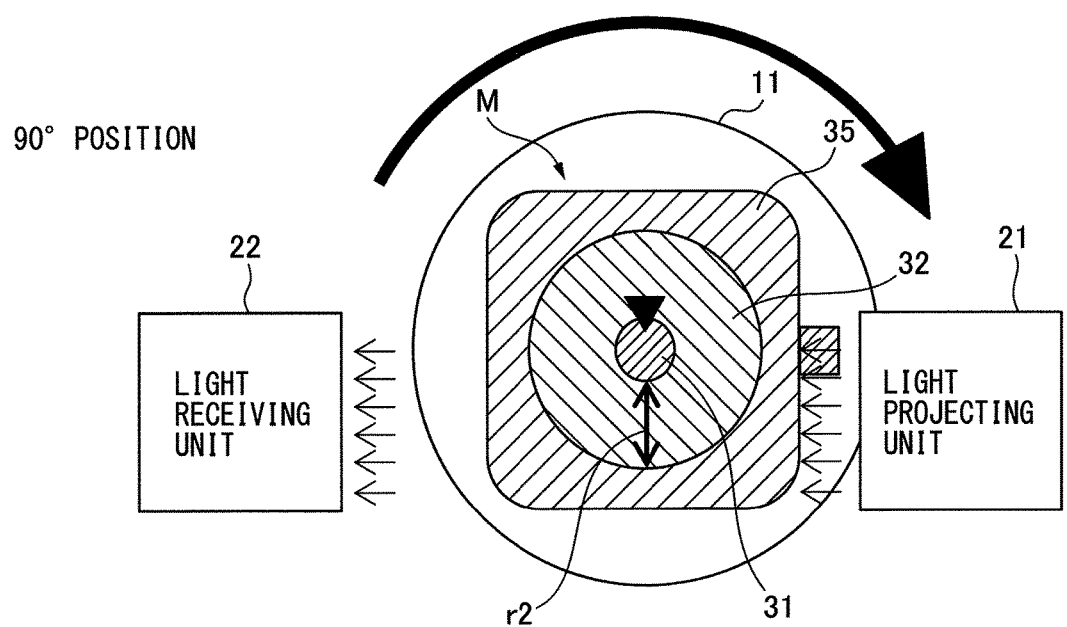
FIG. 9B is a second top view of the measurement unit and the motor installation unit.
Figure 10:
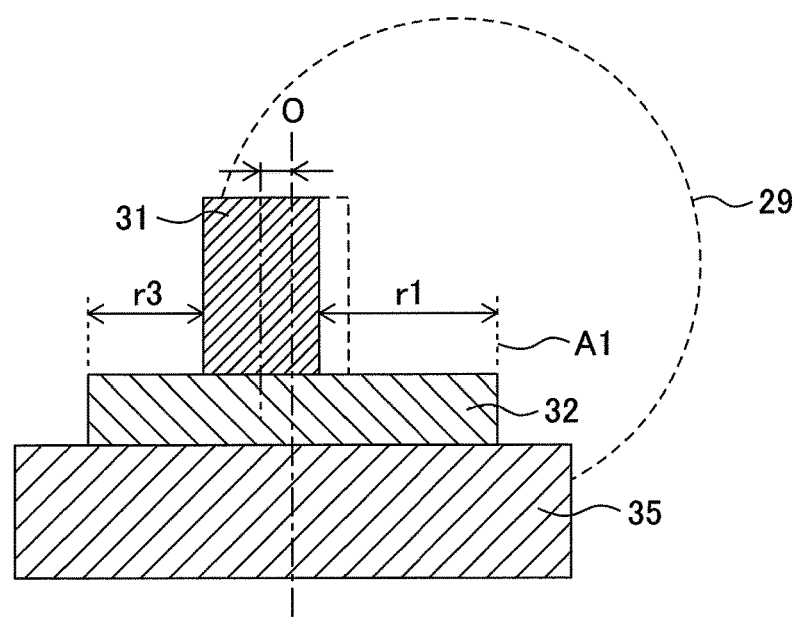
FIG. 10 is a side view of the motor when center run-out is measured.

Subsequently, at step S23, as illustrated in FIG. 9B, the driving unit 15 causes the motor installation unit 11 to be rotated about the axis of rotation O through 90° in a predetermined direction (refer to a connector 39 of the motor M). Then, in order to maintain the positional relationship between the measurement unit 20 and the output shaft 31, the output shaft 31 is rotated through 90° in the opposite direction. Thus, the rotational position of the output shaft 31 remains unchanged as indicated by a black triangle in FIGS. 9A and 9B. Therefore, the position of the output shaft 31 in the plane of projection 29 remains unchanged. Further, a reference axis (not illustrated) similar to that illustrated in FIG. 10 is set. As illustrated in FIG. 9B, a distance r2 between the output shaft 31 of the motor M and the reference axis is measured at the 90° position by the measurement unit 20, and stored in the storage unit.

Figure 9C:
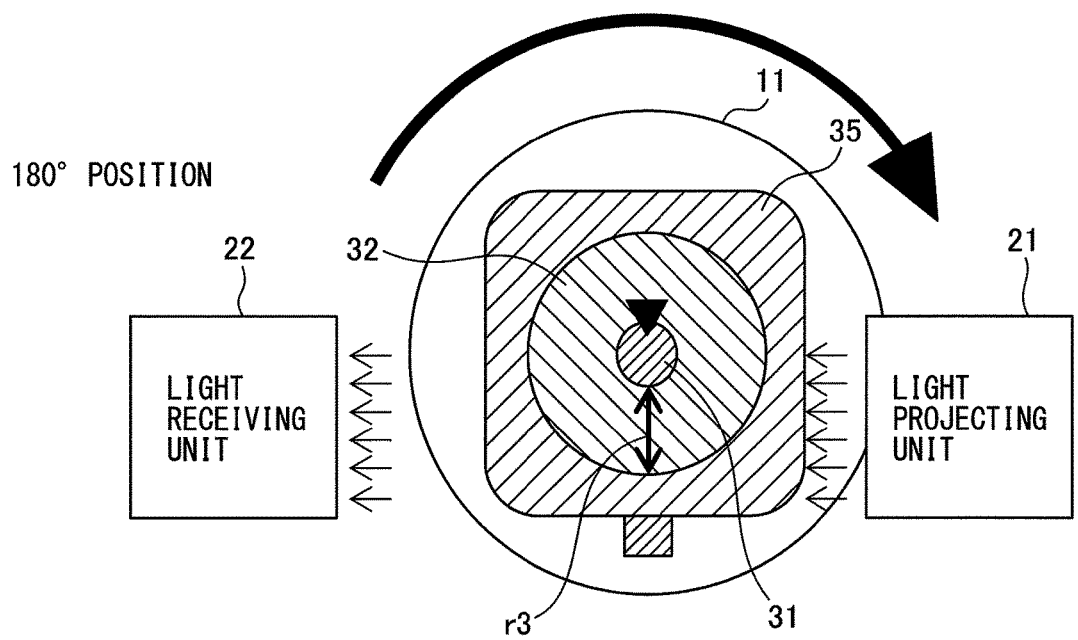
FIG. 9C is a third top view of the measurement unit and the motor installation unit.

Further, at step S24, as illustrated in FIG. 9C, the driving unit 15 further causes the motor installation unit 11 to be rotated about the axis of rotation O through 90° in a predetermined direction. Then, in order to maintain the positional relationship between the measurement unit 20 and the output shaft 31, the output shaft 31 is rotated likewise through 90° in the opposite direction. Further, as illustrated in FIG. 9C, a distance r3 between the output shaft 31 of the motor M and a reference axis similar to that illustrated in FIG. 10 is measured at a 180° position by the measurement unit 20, and stored in the storage unit.

Figure 9D:
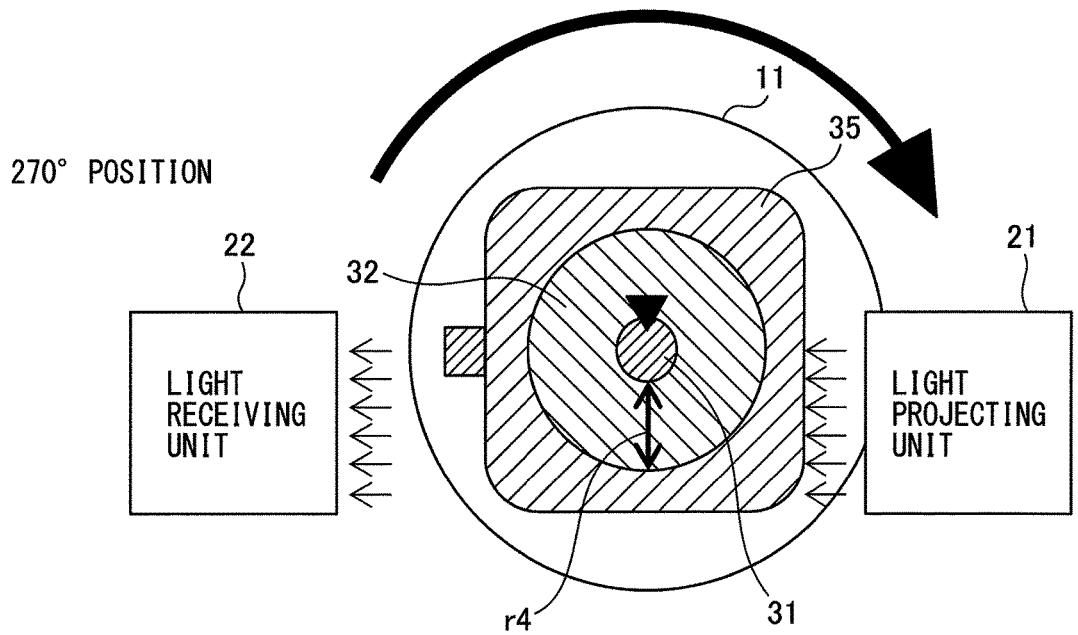
FIG. 9D is a fourth top view of the measurement unit and the motor installation unit.

Further, at step S25, as illustrated in FIG. 9D, the driving unit 15 further causes the motor installation unit 11 to be rotated about the axis of rotation O through 90° in a predetermined direction. Then, in order to maintain the positional relationship between the measurement unit 20 and the output shaft 31, the output shaft 31 is rotated likewise through 90° in the opposite direction. Further, as illustrated in FIG. 9D, a distance r4 between the output shaft 31 of the motor M and a reference axis similar to that illustrated in FIG. 10 is measured at a 270° position by the measurement unit 20, and stored in the storage unit.

Figure 11:
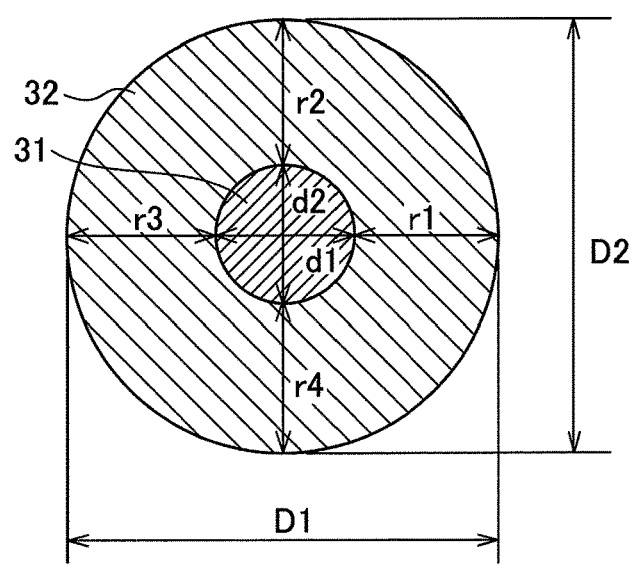
FIG. 11 is a top view of a spigot portion and an output shaft.

FIG. 11 is a top view of the spigot portion and the output shaft. At steps S22 to S25, the distances r1 to r4 between the output shaft 31 and the spigot portion 32 illustrated in FIG. 11 are measured. As can be seen from FIG. 11, the distances r1 and r3 are on a same diameter of the spigot portion 32, and the distances r2 and r4 are on another same diameter of the spigot portion 32. Two outer diameters d1 and d2, which are perpendicular to each other, of the output shaft 31 illustrated in FIG. 11 are obtained, such as by being separately measured beforehand by the operator.

Figure 12:
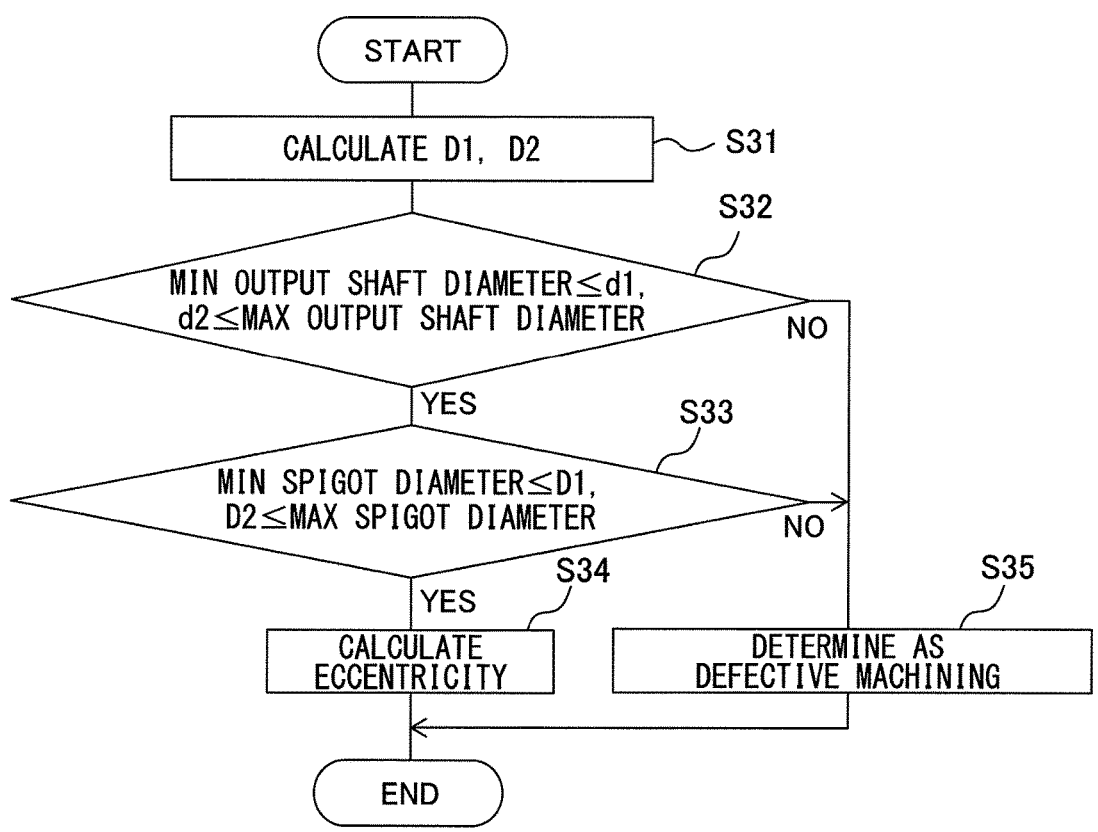
FIG. 12 is a flow chart illustrating an additional operation when center run-out is measured by the shaft accuracy measuring device based on the present invention.

FIG. 12 is a flow chart illustrating an additional operation when the shaft accuracy measuring device based on the present invention measures center run-out, wherein the step S26 of FIG. 8 is described in detail. First, the calculation unit 26 calculates, at step S31, two outer diameters D1 and D2, which are perpendicular to each other, of the spigot portion 32 based on the following equations (2) and (3) (refer to FIG. 11):

$$D1 = d1 + r1 + r3 \quad (2)$$

$$D2 = d2 + r2 + r4 \quad (3)$$

Subsequently, at step S32, it is determined whether each of the outer diameters d1 and d2 of the output shaft 31 is between a maximum outer diameter and a minimum outer diameter of the output shaft 31. The maximum outer diameter and the minimum outer diameter of the output shaft 31 are design values. When it is determined YES at step S32, the process proceeds to step S33.

At step S33, it is determined whether each of the outer diameters D1 and D2 of the spigot portion 32 is between the maximum outer diameter and the minimum outer diameter of the spigot portion 32. The maximum outer diameter and the minimum outer diameter of the spigot portion 32 are design values. When it is determined NO at step S32 and step S33, the process proceeds to step S35, and is ended on the basis of there being some machining defect or assembling defect in the motor M.

When it is determined YES at step S33, the process proceeds to step S34. At step S34, the calculation unit 26 calculates center run-out of the output shaft 31 based on the following equation (4):

$$\text{(Eccentricity)} = \sqrt{(r3-r1)^2 + (r4-r2)^2} \quad (4)$$

In this manner, the shaft accuracy measuring device 10 of the present invention can easily calculate center run-out of the output shaft 31 of the motor M.

Figure 13:
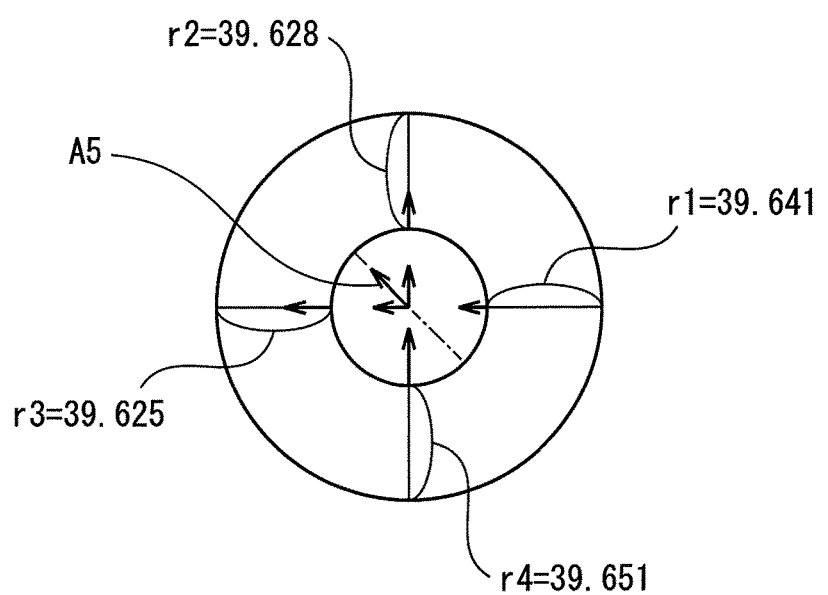
FIG. 13 is a top view of a spigot portion and an output shaft in an example.

FIG. 13 is a top view of the spigot portion and the output shaft in an example. In FIG. 13, let it be assumed that r1=39.641 mm, r2=39.628 mm, r3=39.625 mm, and r4=39.651 mm are measured. In this instance, a first deviation (r3−r1) is −0.016, and a second deviation (r4−r2) is 0.023; thus, a total of the deviations is represented by the following equation (5):

$$\text{(Total deviation)} = \sqrt{(\text{firstdeviation})^2 + (\text{seconddeviation})^2} \quad (5)$$

The total deviation (=0.028) corresponds to the amount of center run-out. The direction of the total deviation is as indicated by a black arrow A5 of FIG. 13. Thus, it is possible to grasp the amount of center run-out and the direction of center run-out by the shaft accuracy measuring device 10 of the present invention.

Figure 14:
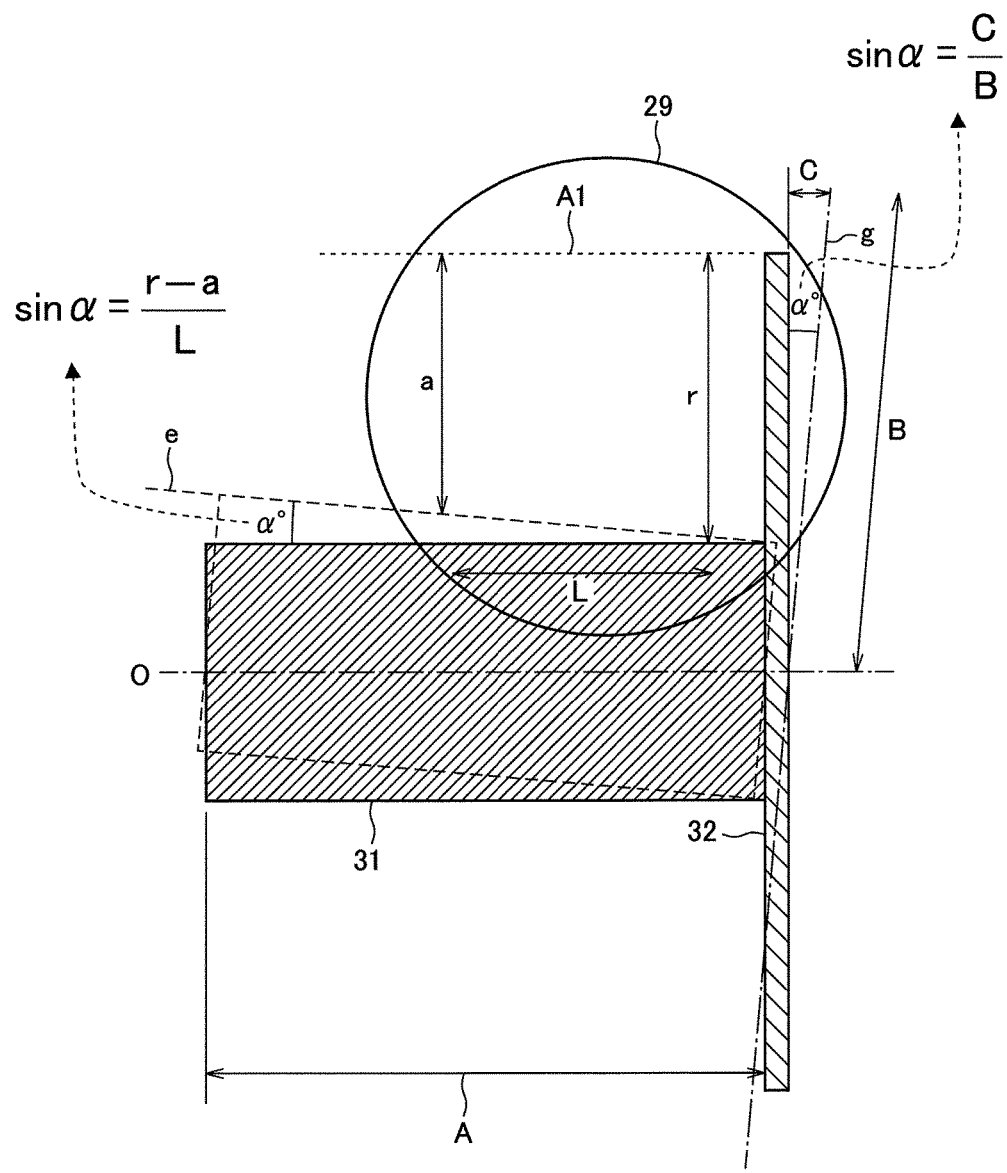
FIG. 14 is a side view of the spigot portion and the output shaft.

It will next be described that the shaft accuracy measuring device 10 measures face run-out. FIG. 14 is a side view of the output shaft and the spigot portion. As illustrated in FIG. 14, the plane of projection 29 of the measurement unit 20 includes an edge of the spigot portion 32 and part of a circumferential surface including a proximal end of the output shaft 31.

In FIG. 14, a reference axis A1 parallel to the axis of rotation O extends from the edge of the spigot portion 32. A distance r between the output shaft 31 and the reference axis A1 in the vicinity of the proximal end of the output shaft 31 is set. The distance r corresponds to each of the distances r1-r4 illustrated in FIG. 11.

Further, a distance L from the proximal end of the output shaft 31 to an appropriate position in the plane of projection 29 along the circumferential surface of the output shaft 31, e.g., a predetermined position from the spigot portion 32 is set. Preferably, the distance L is larger than the radius of the plane of projection 29.

FIGS. 15A through 15D are schematic views illustrating the output shaft. Let it be assumed that an xy-plane is the upper face of the spigot portion 32, and that a center of the proximal end of the output shaft 31 is located at a cross point between x-axis and y-axis, as can be seen from FIGS. 14 and 15A.

Figure 15A:
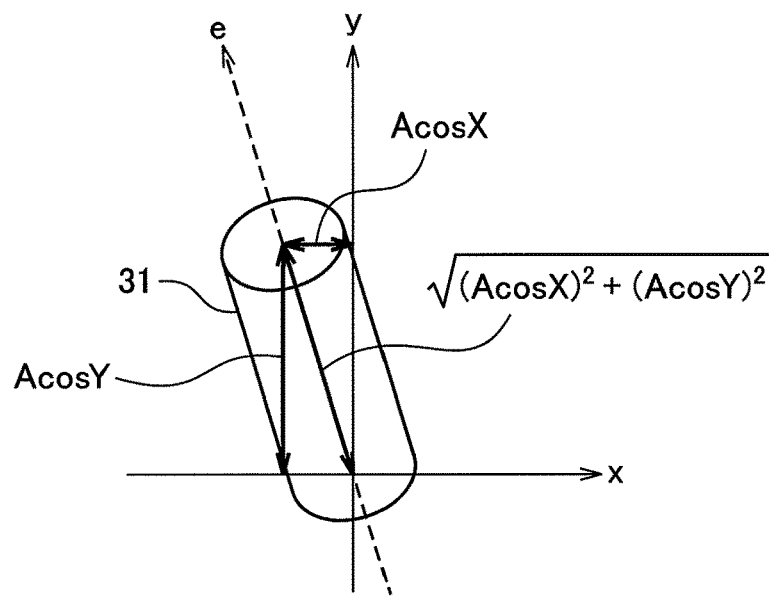
FIG. 15A is a first schematic view illustrating the output shaft.
Figure 15B:
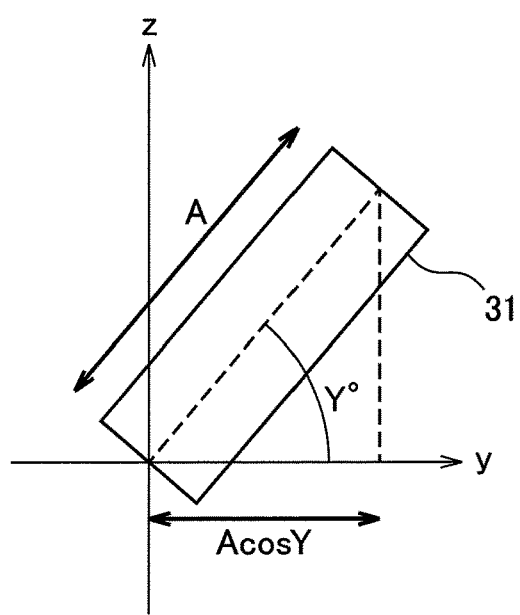
FIG. 15B is a second schematic view illustrating the output shaft.
Figure 15C:
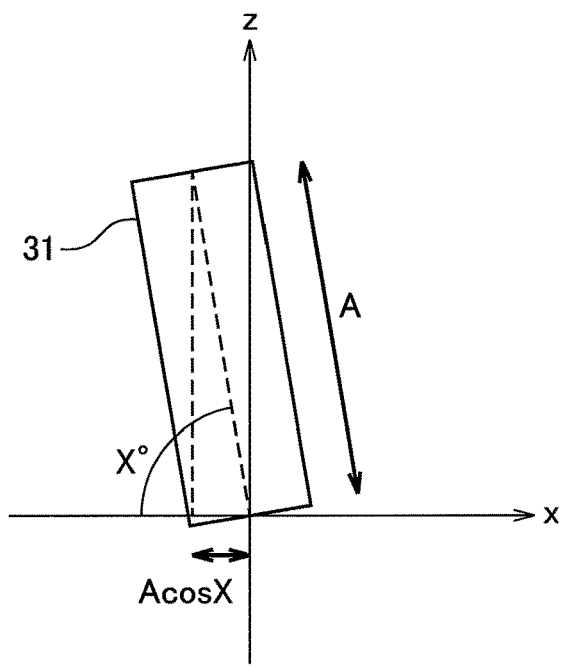
FIG. 15C is a third schematic view of the output shaft.
Figure 15D:
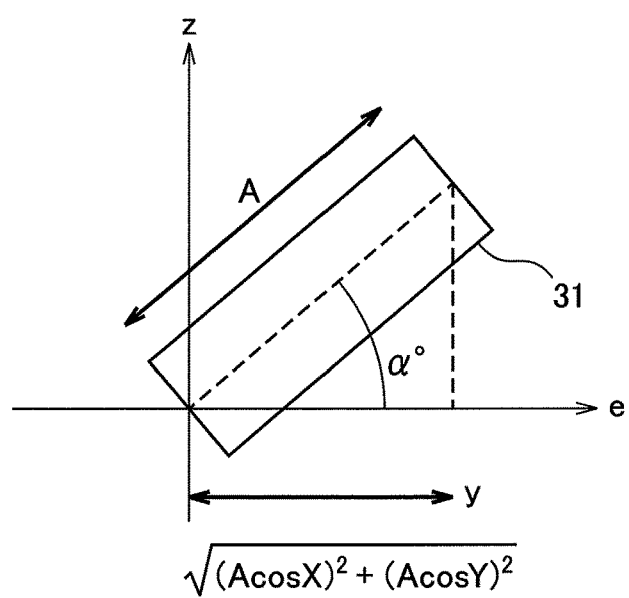
FIG. 15D is a fourth schematic view illustrating the output shaft.

Further, as illustrated in FIGS. 14 and 15D, the direction in which the output shaft 31 is inclined most with respect to a vertical axis (z-axis) is set to be a direction e. Let it be assumed that the length of the output shaft 31 extending from the spigot portion 32 is A, and that the angle between the center of the output shaft 31 and the direction e is an angle α. Further, as illustrated in FIG. 14, a distance a between the reference axis A1 and a line segment indicating the direction e is set at a position on the direction e corresponding to a terminal end away by the distance L from the proximal end of the output shaft 31.

The distance a can be measured concurrently with measuring the distances r1-r4 illustrated in FIG. 11. Thus, when the shaft accuracy measuring device 10 measures face run-out, the distances r1-r4 and the distances a1-a4 are measured together at steps S22-S25 of FIG. 8.

Referring now to FIG. 15B, in the yz-plane illustrated in FIG. 15B, the length of the output shaft 31 along the y-axis is represented by A cos Y on the assumption that the angle between the output shaft 31 and the y-axis is Y°. Likewise, in the xz-plane illustrated in FIG. 15C, the length of the output shaft 31 along the x-axis is represented by A cos X on the assumption that the angle between the output shaft 31 and the x-axis is X°. Thus, as illustrated in FIGS. 15A and 15D, the length of the output shaft 31 along the direction e is represented by the following equation (6):

$$\text{(Length of the output shaft along the direction } e) = \sqrt{(A\cos X)^2 + (A\cos Y)^2} \quad (6)$$

As such, the angle α is represented by the following equation (7):

$$\alpha = \cos^{-1}(\sqrt{(\cos X)^2 + (\cos Y)^2}) \quad (7)$$

Referring again to FIG. 14, a line segment extending through the center of the proximal end of the spigot portion 32 perpendicular to the direction e is set to be a line segment g. Further, a predetermined distance B along the line segment g from the center of the proximal end of the spigot portion 32 is set. Preferably, the predetermined distance B is the radius of the spigot portion 32.

As can be seen from FIG. 14, an amount of face run-out 2C is obtained from the following equation (8):

$$2C = 2B\sin\alpha = 2B\frac{r-a}{L} \quad (8)$$

The "r–a" in equation (8) is obtained from the following equation (9):

$$(r-a) = \sqrt{\left(\frac{ABS(r1-a1) + ABS(r3-a3)}{2}\right)^2 + \left(\frac{ABS(r2-a2) + ABS(r4-a4)}{2}\right)^2}$$

Thus, the calculation unit 26 of the shaft accuracy measuring device 10 can easily measure the amount of face run-out as described above.

In this manner, in the present invention, the light projecting unit 21 and the light receiving unit 22 suffice with one each, so that it is possible to easily measure, in a non-contact manner, axial run-out, center run-out, and face run-out of the motor, while suppressing the cost required for the shaft accuracy measuring device 10. In the present invention, since measurement is performed in a non-contact manner, the shaft accuracy of the motor M can be automatically measured regardless of the operator's skill level. Thus, even when many motors are manufactured, it is possible to easily measure the shaft accuracy of all the motors.

Figure 16:
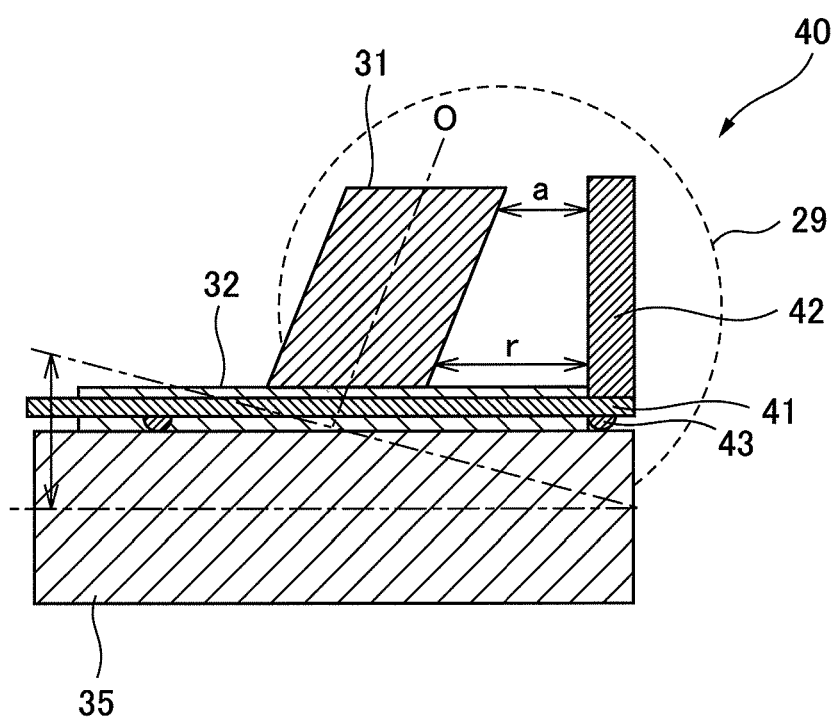
FIG. 16 is another side view of the output shaft and spigot portion.

FIG. 16 is another side view of the output shaft and the spigot portion. In FIG. 16, a measuring jig is provided on the upper surface (flange surface) of the flange 35.

The measuring jig 40 includes an annular portion 41 surrounding the spigot portion 32, and a reference axis portion 42 extending perpendicularly with respect to the annular portion 41. The reference axis portion 42 may extend at a predetermined angle with respect to the annular portion 41. As can be seen from FIG. 16, the annular portion 41 is large enough to surround the spigot portion 32. Further, preferably, three support portions 43 for three-point support are provided on the lower surface of the annular portion 41.

When the measuring jig 40 is used, as illustrated in FIG. 16, the distance between the reference axis portion 42 and the output shaft 31 in the vicinity of the proximal end is set to be a distance r, and the distance between the reference axis portion 42 and the output shaft 31 in the vicinity of the distal end is set to be a distance a. Thus, face run-out is measured in a manner similar to that described above. Naturally, it is also possible to measure center run-out alone in a state in which the measuring jig 40 is used.

When the distance between the spigot portion 32 of the motor M and the flange surface is short, there is a possibility in which the reference axis A1 illustrated in FIG. 14 may not be set appropriately. Even in such an instance, it is possible to appropriately measure the distance r and the distance a by providing the measuring jig 40 on the flange 35. Consequently, it is possible to easily measure face run-out and/or center run-out of the motor.

Figure 17A:
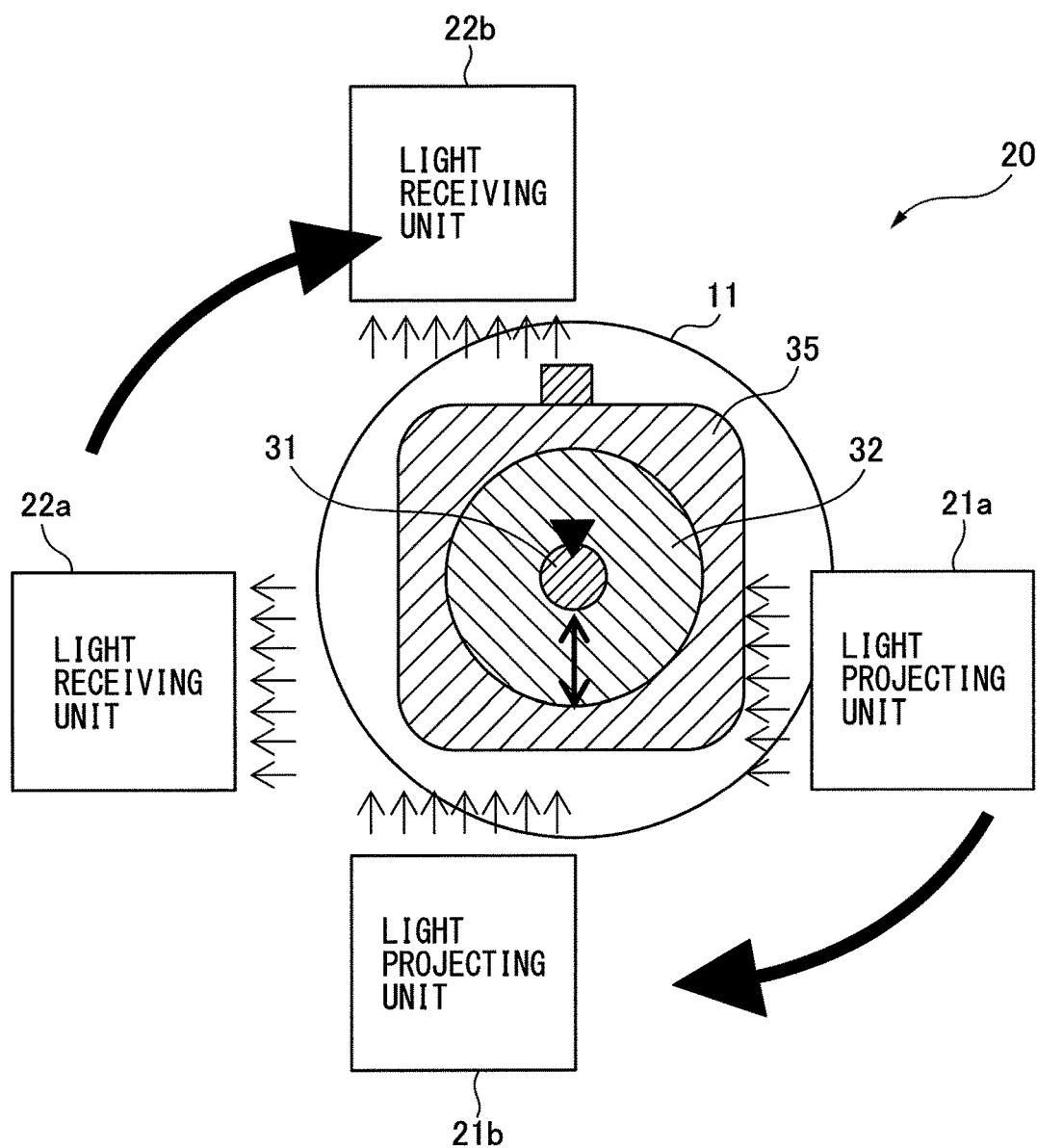
FIG. 17A is a top view of a case in which the measurement unit includes two light projecting units and two light receiving units.

As illustrated in FIG. 17A, the measurement unit 20 may include two light projecting units 21a and 21b and two light receiving units 22a and 22b. As illustrated, a measurement light from the light projecting unit 21a is received by the light receiving unit 22a, and a measurement light from the light projecting unit 21b is received by the light receiving unit 22b. The two light projecting units 21a and 21b and the two light receiving units 22a and 22b are located such that the measurement light from the light projecting unit 21a and the measurement light from the light projecting unit 21b become perpendicular to each other.

In such an instance, the measurements at steps S22 and S23 illustrated in FIG. 8 are performed in a state as illustrated in FIG. 17A. Subsequently, the motor installation unit 11 is rotated through 180°, and the output shaft 31 is rotated through 180° in the opposite direction. Further, the measurements at steps S24 and S25 illustrated in FIG. 8 are performed in such a state. Thereafter, at step S26, the above-described center run-out and/or face run-out are calculated based on acquired data.

In such an instance, it is possible to calculate the center run-out and/or face run-out merely by rotating the motor installation unit 11 through 180°. Further, since it is sufficient that the number of times of measurement is two, it is also possible to reduce the time required for the measurements.

Figure 17B:
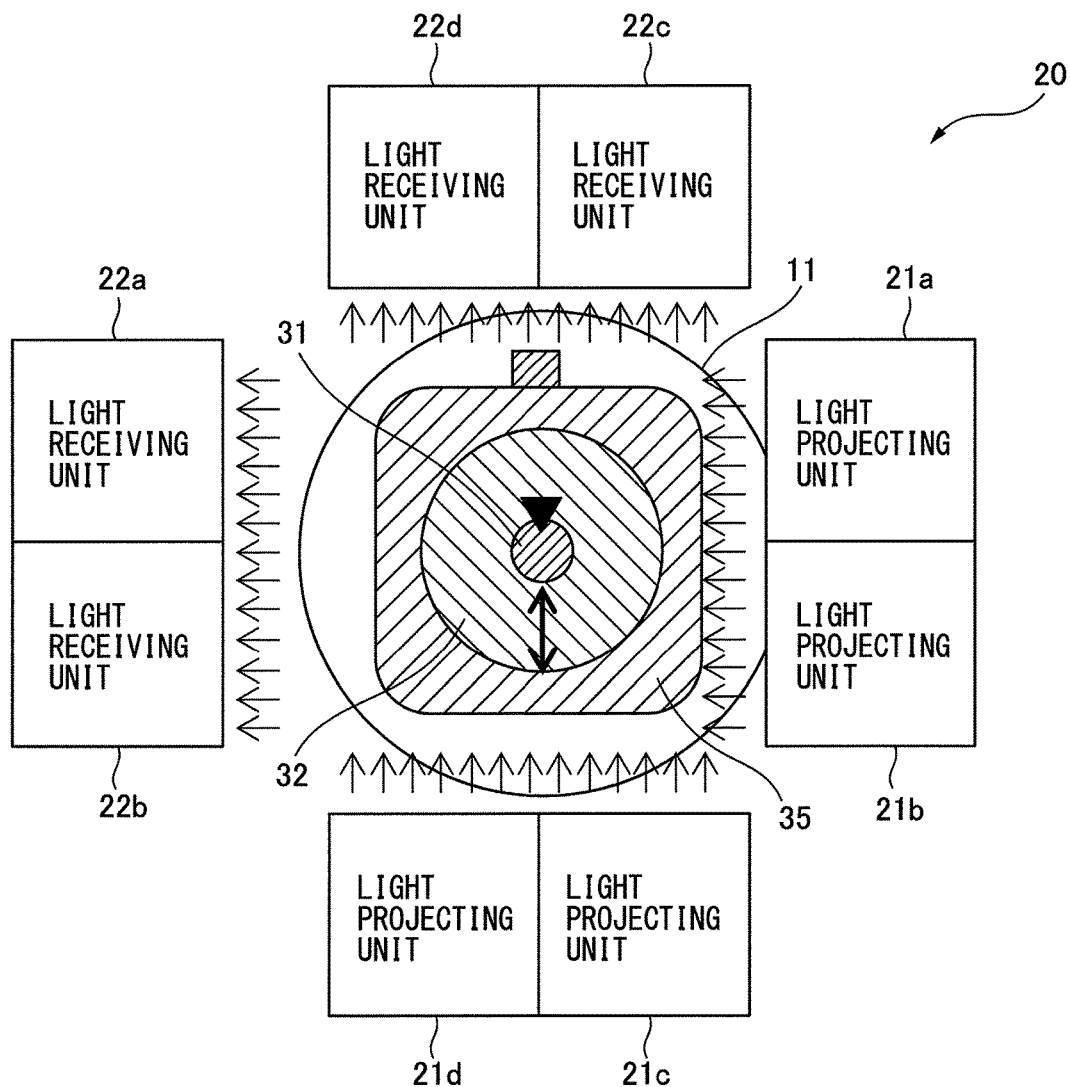
FIG. 17B is a top view of a case in which the measurement unit includes four light projecting units and four light receiving units.

Further, as illustrated in FIG. 17B, the measurement unit 20 may include four light projecting units 21a-21d and four light receiving units 22a-22d. As illustrated, the light projecting unit 21a and the light projecting unit 21b are located adjacent to each other, and the light receiving unit 22a and the light receiving unit 22b are also located adjacent to each other. The light projecting unit 21c and the light projecting unit 21d are located adjacent to each other, and the light receiving unit 22c and the light receiving unit 22d are also located adjacent to each other.

Further, the four light projecting units 21a-21d and the four light receiving units 22a-22d are located such that measurement lights from the light projecting unit 21a and the light projecting unit 21b and measurement lights from the light projecting unit 21c and the light projecting unit 21d become perpendicular to each other.

As can be seen from FIG. 17B, the measurement area of the two light projecting units 21a and 21b (corresponding to the plane of projection 29) includes the entire diameter portion of the output shaft 31. Likewise, the measurement area of the two light projecting units 21c and 21d (corresponding to the plane of projection 29) also includes the entire diameter portion of the output shaft 31. In such an instance, it will be appreciated that the measurements at steps S22-S26 of FIG. 8 can be performed merely by rotating the output shaft 31 arbitrarily without rotating the motor installation unit 11. Consequently, it is possible to reduce the time required for the measurements. The reason for rotating the output shaft 31 is to maintain the positional relationship between the measurement unit 20 and the output shaft 31. For a similar reason, it is also preferably to rotate the output shaft 31 in the below-described embodiments illustrated in FIGS. 18A and 18B.

In FIG. 1, there is illustrated a moving unit 16 that unitarily moves the measurement unit 20 including the light projecting unit 21 and the light receiving unit 22. Preferably, the moving unit 16 includes a particular guide mechanism, thereby allowing the measurement unit 20 to move to a predetermined position appropriately. Alternatively, preferably, the moving unit 16 is an articulated robot, which allows the measurement unit 20 to move in a complex manner.

When the moving unit 16 is thus provided, in FIGS. 9A-9D and the like, the measurement unit 20 may be rotated by the moving unit 16 relative to the motor installation unit 11, instead of the motor installation unit 11 being rotated.

Figure 18A:
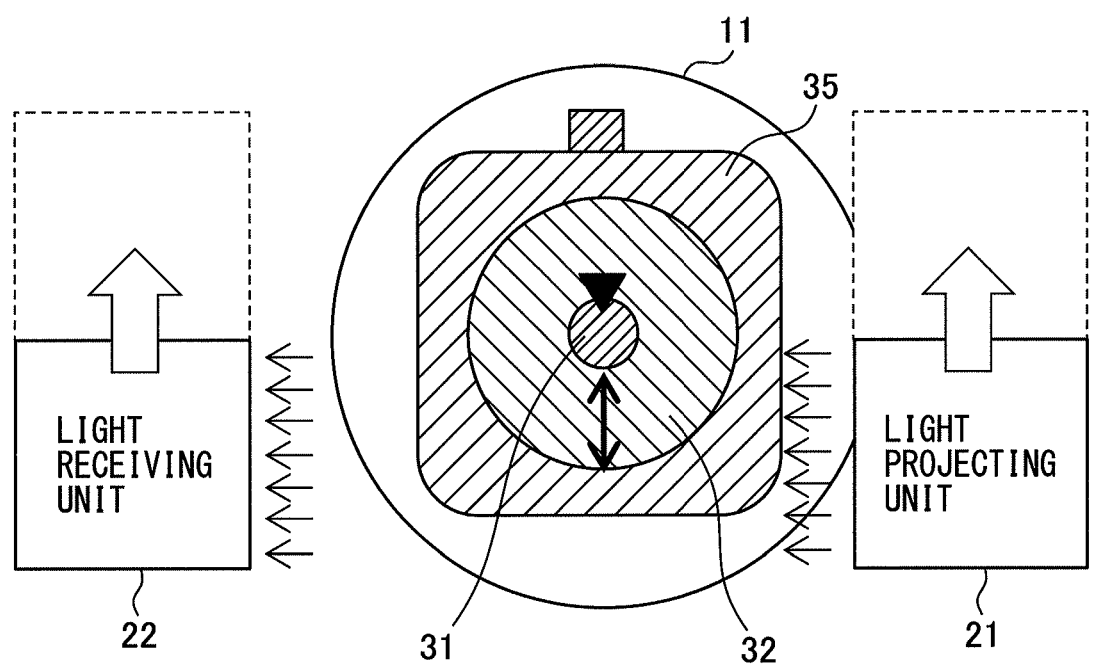
FIG. 18A is a top view illustrating a movable light projecting unit and a movable light receiving unit.

Further, the moving unit 16 can unitarily and translationally move the measurement unit 20 including the light projecting unit 21 and the light receiving unit 22. As illustrated in FIG. 18A, which is a top view illustrating the light projecting unit and the light receiving unit, the moving unit 16 can cause the light projecting unit 21 and the light receiving unit 22 to be unitarily slid in a direction perpendicular to the axis of rotation O.

First, the process of step S22 illustrated in FIG. 8 is performed by the light projecting unit 21 and the light receiving unit 22, which are located at positions illustrated in FIG. 18A. Subsequently, the light projecting unit 21 and the light receiving unit 22 are moved by the moving unit 16 to broken line positions illustrated in FIG. 18A, respectively. Then, the process of step S24 illustrated in FIG. 8 is performed.

Then, the motor installation unit 11 is rotated through 90° in a predetermined direction, and the output shaft 31 is rotated through 90° in the opposite direction. Then, the process of step S25 illustrated in FIG. 8 is performed. Subsequently, the light projecting unit 21 and the light receiving unit 22 are moved by the moving unit 16 to solid line positions illustrated in FIG. 18A, respectively. Thereafter, the process of step S23 illustrated in FIG. 8 is performed. Subsequently, at step S26, the above-described center run-out and/or face run-out is calculated based on acquired data. In such an instance, the process illustrated in FIG. 8 can be performed in a short time.

Figure 18B:
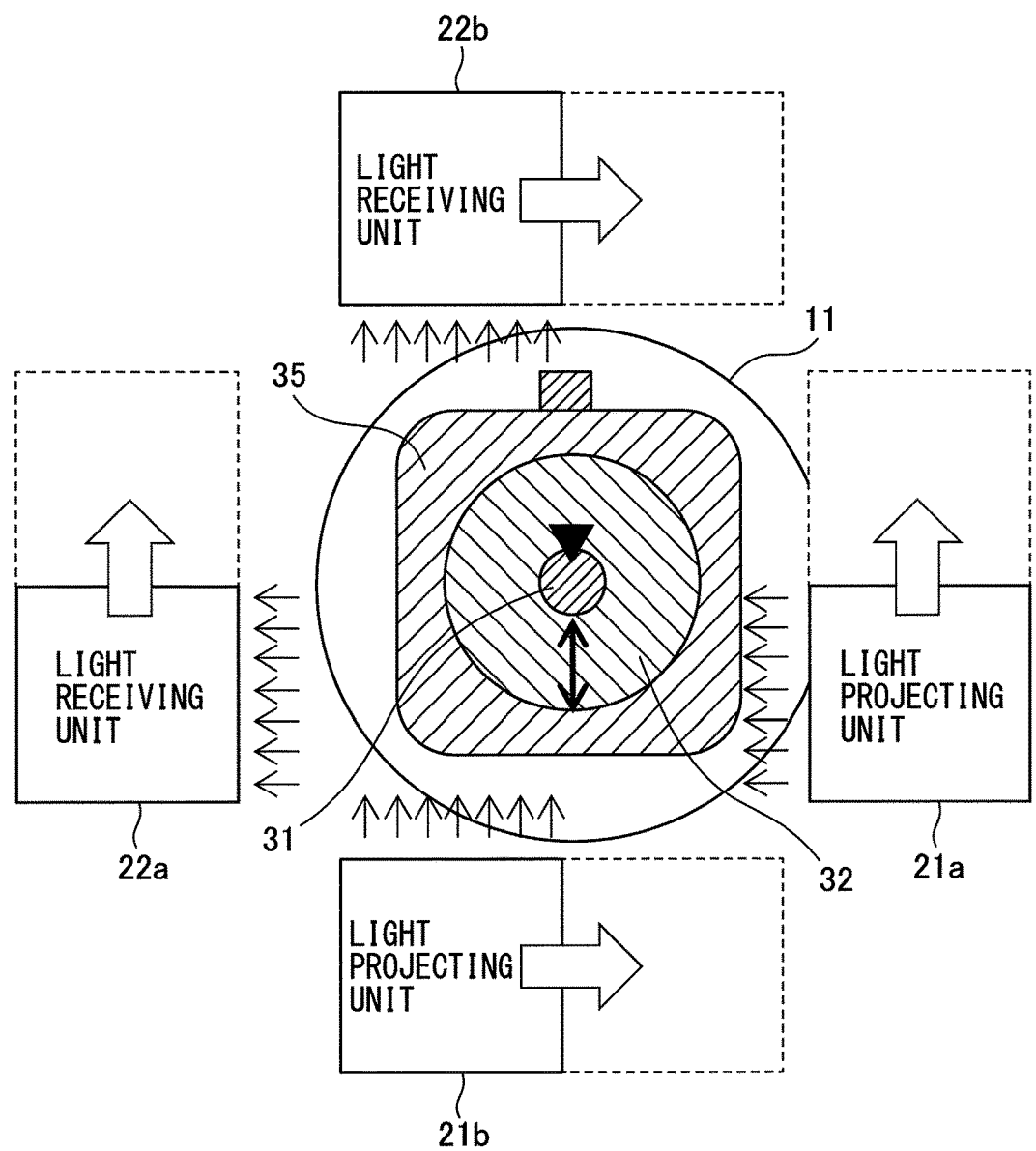
FIG. 18B is a top view illustrating two movable light projecting units and two movable light receiving units.

Further, FIG. 18B is a top view illustrating movable two light projecting units and light receiving units. In FIG. 18B, the light projecting units 21a and 21b and the light receiving units 22a and 22b are located in a manner similar to that of FIG. 17A.

In such an instance, the measurements of steps S22 and S23 are performed in the state illustrated in FIG. 18B. Subsequently, the light projecting units 21a and 21b and the light receiving units 22a and 22b are moved by the moving unit 16 to solid line positions illustrated in FIG. 18B, respectively. In such a state, measurements of steps S24 and S25 illustrated in FIG. 8 are performed. Subsequently, at step S26, the above-described center run-out and/or face run-out is calculated based on acquired data. In such an instance, it will be appreciated that the measurements of steps S22-S26 in FIG. 8 can be performed without rotating the motor installation unit 11. In such an instance, the process illustrated in FIG. 8 can be performed in a further short time.

ADVANTAGE OF THE INVENTION

In the first aspect of the present invention, since the light projecting unit and the light receiving unit suffice with one each, it is possible to easily measure, in a non-contact manner, axial run-out, center run-out, and face run-out of the motor, while suppressing the cost required for the shaft accuracy measuring device. Thus, the shaft accuracy of the motor can be automatically measured regardless of the operator's skill level. Further, even when many motors are manufactured, it is possible to easily measure the shaft accuracy of all the motors.

In the second aspect of the present invention, it is possible to easily measure the axial run-out among the shaft accuracy of the motor.

In the third aspect of the present invention, it is possible to easily measure the center run-out among the shaft accuracy of the motor.

In the fourth aspect of the present invention, it is possible to easily measure the face run-out among the shaft accuracy of the motor.

In the fifth aspect of the present invention, even when the distance between the spigot portion of the motor and the end surface of the motor is short, it is possible to easily measure the face run-out and the center run-out of the motor using a measuring jig.

In the sixth aspect of the present invention, by a small number of times of measurement, it is possible to measure the center run-out and the face run-out among the shaft accuracy of the motor.

In the seventh aspect of the present invention, since the measurement unit is moved by the moving unit, it is possible to measure the center run-out and the face run-out among the shaft accuracy of the motor in a shorter time. Preferably, the moving unit includes a particular guide mechanism, and the moving unit is an articulated robot.

While the present invention has been described using exemplary embodiments thereof, those skilled in the art could understand that the above-described changes, as well as various other changes, omissions, and additions, are possible without departing from the scope of the present invention.

What is claimed is:

1. A shaft accuracy measuring device comprising:
   a measurement unit including a light projecting unit that projects a measurement light and a light receiving unit that receives the measurement light projected by the light projecting unit;
   a motor installation unit that installs a motor (M) such that an output shaft of the motor is disposed between the light projecting unit and the light receiving unit so that the light projecting unit directly faces the light receiving unit;
   a calculation unit that calculates at least one of axial run-out, center run-out, and face run-out of the motor based on a measurement result of the measurement unit, and
   a driving unit that rotates the motor installation unit relative to the measurement unit and rotates the output shaft of the motor;
   wherein while the driving unit rotates the motor installation unit relative to the measurement unit and rotates the output shaft of the motor, the calculation unit measures the center run-out of the output shaft based on the measurement result of the measurement unit.

2. A shaft accuracy measuring device comprising:
   a measurement unit including a light projecting unit that projects a measurement light and a light receiving unit that receives the measurement light projected by the light projecting unit;
   a motor installation unit that installs a motor (M) such that an output shaft of the motor is disposed between the light projecting unit and the light receiving unit so that the light projecting unit directly faces the light receiving unit;
   a calculation unit that calculates at least one of axial run-out, center run-out, and face run-out of the motor based on a measurement result of the measurement unit; and
   a driving unit that rotates the motor installation unit relative to the measurement unit and rotates the output shaft of the motor;

wherein while the driving unit rotates the motor installation unit relative to the measurement unit and rotates the output shaft of the motor, the calculation unit measures the face run-out of the output shaft based on the measurement result of the measurement unit.

3. A shaft accuracy measuring device comprising:
a measurement unit including a light projecting unit that projects a measurement light and a light receiving unit that receives the measurement light projected by the light projecting unit;
a motor installation unit that installs a motor (M) such that an output shaft of the motor is disposed between the light projecting unit and the light receiving unit;
a calculation unit that calculates at least one of axial run-out, center run-out, and face run-out of the motor based on a measurement result of the measurement unit; and
a moving unit that unitarily and translationally moves the light projecting unit and the associated light receiving unit, perpendicular to an output axis of the motor.

4. The shaft accuracy measuring device according to any one of claims 1 to 3, further comprising:
a driving unit that rotates the output shaft of the motor installed on the motor installation unit;
wherein the calculation unit calculates the axial run-out of the output shaft based on the measurement result of the measurement unit when the driving unit rotates the output shaft of the motor.

5. The shaft accuracy measuring device according to any one of claim 2 or 3, further comprising:
a driving unit that rotates the motor installation unit relative to the measurement unit and rotates the output shaft of the motor;
wherein while the driving unit rotates the motor installation unit relative to the measurement unit and rotates the output shaft of the motor, the calculation unit measures the center run-out of the output shaft based on the measurement result of the measurement unit.

6. The shaft accuracy measuring device according to any one of claims 1, 2, or 3, further comprising:
a driving unit that rotates the motor installation unit relative to the measurement unit and rotates the output shaft of the motor;
wherein while the driving unit rotates the motor installation unit relative to the measurement unit and rotates the output shaft of the motor, the calculation unit measures the face run-out of the output shaft based on the measurement result of the measurement unit.

7. The shaft accuracy measuring device according to claim 5, further comprising a measuring jig comprising a reference axis portion located in vicinity of the output shaft of the motor at an end face of the motor and having a predetermined angle with respect to the end face.

8. The shaft accuracy measuring device according to any one of claims 1 to 3, wherein the measurement unit comprises a plurality of the light projecting unit and the light receiving unit.

9. The shaft accuracy measuring device according to any one of claims 1 or 2, further comprising a moving unit that unitarily and translationally moves the light projecting unit and the associated light receiving unit.

* * * * *